United States Patent [19]
Taylor et al.

[11] Patent Number: 5,552,167
[45] Date of Patent: Sep. 3, 1996

[54] RICE BRAN OIL ANTIOXIDANT

[75] Inventors: James B. Taylor, Sparta; Thomas M. Richar, Long Valley; Carolyn L. Wilhelm, Hackettstown; Michael M. Chrysam, Blairstown; Michael Otterburn, Randolph; Gilbert A. Leveille, Denville, all of N.J.

[73] Assignee: Nabisco, Inc., Parsippany, N.J.

[21] Appl. No.: 435,704

[22] Filed: May 5, 1995

[51] Int. Cl.$^6$ .................................... A23D 9/00
[52] U.S. Cl. ..................... 426/99; 426/302; 426/542
[58] Field of Search ..................... 426/99, 302, 542

[56] References Cited

U.S. PATENT DOCUMENTS

| | | | |
|---|---|---|---|
| 4,211,800 | 7/1980 | Scharschmidt | 426/302 |
| 4,356,197 | 10/1982 | Devitt | 426/89 |
| 4,469,710 | 9/1984 | Rielley | 426/417 |
| 4,871,558 | 10/1989 | Tackikawa | 426/99 |
| 5,126,152 | 6/1992 | Feeney | 426/302 |
| 5,175,012 | 12/1992 | Shin | 426/542 |
| 5,202,137 | 4/1993 | Duffy | 426/302 |
| 5,230,916 | 7/1993 | Chang | 426/330.6 |
| 5,290,579 | 3/1994 | Hitotsumatsu | 426/489 |
| 5,292,537 | 3/1994 | Hammond et al. | 426/44 |
| 5,376,390 | 12/1994 | Hammond | 426/44 |
| 5,391,383 | 2/1995 | Sullivan | 426/99 |

OTHER PUBLICATIONS

Bailey's Industrial Oil & Fat Products, vol. I, pp. 406–409 & vol. 3, pp. 108–109, 4th ed., John Wiley, New York, 1979 and 1985.

Mensink, R. P., and Katan, M. B., New Eng. J. Med., 323: 439–445 (1990).

*Primary Examiner*—Carolyn Paden

[57] ABSTRACT

High linolenic edible oils such as soybean oil and canola are stabilized by blending the oils with rice bran oil in amounts effective to render the oils stable to oxidation. Preferred embodiments employ from about 0.5% to about 10%, more narrowly from about 2% to about 5%, by weight rice bran oil specially processed to retain unsaponifiable matter. In one embodiment, physically refined rice bran oil is used. The natural stabilized oil is especially useful as a spray oil for crackers, nuts, chips, and other snack products.

18 Claims, No Drawings

RICE BRAN OIL ANTIOXIDANT

TECHNICAL FIELD

This invention relates to a natural antioxidant for edible oils containing high linolenic acid levels such as soybean oil and canola which are particularly useful as spray oils that enhance the organoleptic character of crackers, nuts, chips, and other snack products.

Many food constituents are adversely affected by oxygen in the air. This is particularly so of fats, oils, and oily flavor compounds that may become rancid on excessive exposure to air. This is particularly true of high linolenic oils because these are most susceptible to oxidation, yielding off flavors. Oxygen is always present in and around foods, and, though it may be minimized by nitrogen or vacuum packaging, something must be done to provide practical protection for many products such as crackers and snacks to which oil is applied as a spray to enhance eating quality, flavor and appearance.

BACKGROUND ART

Two main approaches to the stabilization of edible oils containing high linolenic acid levels involve the addition of antioxidants or hydrogenation of the oils. An antioxidant, as the name implies, tends to prevent oxidation. Natural antioxidants present in foods include lecithin, vitamin E, and certain sulfur-containing amino acids. However, the most effective antioxidants are synthetic chemicals approved by the Food and Drug Administration for addition to foods. Without these antioxidants, food products such as crackers, potato chips, breakfast cereals, fat-containing dehydrated foods, and many other fatty foods could not be stored as long without developing off-flavors and rancidity. As mentioned above, this is particularly true of crackers and other snack items to which oil is often applied while they are warm so that the oil penetrates the product somewhat and improves bite and mouthfeel while a portion remains on the surface to provide a desirable sheen.

Among the common antioxidants are butylated hydroxyanisole (BHT), butylated hydroxytoluene (BHT), tertiary butylated hydroquinone (TBQH), and propyl gallate. Other diverse materials such as ascorbic acid, stannous chloride, and tocopherols (vitamin E) can perform the function of antioxidants. Some food additives serve dual roles; sulfur dioxide, for example, can function both as a preservative and an antioxidant. Many consumers eschew oils containing synthetic antioxidants, however, due to studies suggesting they might have mutagenic and carcinogenic properties.

In addition to synthetic antioxidants, hydrogenation is also used to stabilize oils against oxidation. Hydrogenated coconut oil is a preferred spray oil, but partially hydrogenated peanut oil and soybean oil are often used as well (Bailey's Industrial Oil and Fat Products, 4th ed., vol. 3, John Wiley, New York, 1985, page 109). However, hydrogenation produces substantial amounts of trans fatty acids not present in natural oils, which contain only cis double bonds, particularly where the oils are partially hydrogenated. Trans fatty acids have been recently shown to raise low density lipoprotein cholesterol levels and to lower high density lipoprotein serum cholesterol levels in adults fed fats having these acids (Mensink, R. P., and Katan, M. B., New Eng. Jour. Med. 323: 439–445 (1990)). Hence, many consumers suspect that food products containing hydrogenated or partially hydrogenated oils may be unhealthy.

It would be desirable to have a natural antioxidant for edible oils, particularly for oils especially susceptible to oxidation such as high linolenic oils, e.g., soybean oil and canola (which has the lowest concentration of saturated fatty acids of commercial edible oils), that are used as spray oils on food products.

DISCLOSURE OF THE INVENTION

It is an object of the invention to provide a natural antioxidant for edible oils.

It is a further and more specific object of the invention to provide a natural antioxidant for edible oils that provides stability to the oils without changing, to any significant degree, the physical properties of the oils.

It is another specific object of the invention to provide a natural antioxidant for edible oils that are sprayed on crackers and snacks or used as ingredients in other food products wherein partially hydrogenated oils are commonly employed.

These and other objects are achieved by the present invention, which provides stable edible oils and methods for preparing stable edible oils using a natural antioxidant. In the practice of the invention, an edible oil susceptible to oxidation is stabilized by adding rice bran oil, particularly rice bran oil specially processed to retain unsaponifiable matter, to the edible oil in amounts effective to render the edible oil stable to oxidation. Typical edible oils are those containing high linolenic acid levels such as soybean oil, canola, walnut oil, wheat germ oil, menhaden oil, rapeseed oil and mixtures of these oils. Preferred embodiments employ from about 0.5% to about 10%, more narrowly from about 2% to about 5%, by weight rice bran oil. Physically refined rice bran oil is employed in some embodiments. The oils are simply blended together.

The invention is particularly useful for the stabilization of oils that are used as spray oils on crackers, chips, nuts, and other snack products. The naturally stabilized oil such as soybean oil or canola or mixtures is sprayed on a baked, roasted or popped snack product substrate, which typically contains starch or nuts. Snacks, e.g., crackers, that have thin, translucent and slightly glossy coatings which do not develop off-flavors on storage are obtained using preferred processes of the invention.

INDUSTRIAL APPLICABILITY

The invention is based upon the finding that certain amounts of processed rice bran oil, when added to a high linolenic oil, stabilizes the oil and prevents off-flavors and rancidity without the use of hydrogenation or synthetic antioxidants.

In the practice of the invention, rice bran oil is added to an edible oil susceptible to oxidation in amounts effective to render the edible oil stable. By "stable" is meant free of off-flavors and rancidity on storage at room temperature for a period of at least six months, a degree of stability afforded by currently used synthetic antioxidants.

Preferred embodiments employ a rice bran oil that has been specially processed to retain unsaponifiable matter, which enriches the multicomponent system of natural antioxidants in the oil while at the same time removing objectionable colors and flavors sometimes found in rice bran oil. Physically refined rice bran oil (PRRBO) is employed in some embodiments. PRRBO is rich in several antioxidants, including tocopherols (vitamin E), tocotrienols (compounds homologous to tocopherols that differ by the presence of three unsaturated bonds in the phytyl side chain), and oryzanol (a mixture of ferulic acid esters of sterols, e.g., β-sitosteryl ferulate and methyl ferulate, and triterpene alcohols, e.g., 24-methylenecycloartenyl ferulate; see Bailey's Industrial Oil and Fat Products, 4th ed., John Wiley, New York, 1979, volume 1, pages 407 to 409). Stabilized rice bran and rice bran products have been obtained by deactivating naturally occurring lipases in the bran (U.S. Pat. Nos. 5,292,537 and 5,376,390 to Hammond). An antioxidant has also been obtained from defatted ricebran (U.S. Pat. No. 5,175,012 to Shin, et al.).

The invention is suitable for the preservation of any edible oils susceptible to oxidation, especially for edible oils containing high linolenic acids such as soybean oil, canola, wheat germ oil, menhaden oil, rapeseed oil, and mixtures of these oils. The invention is particularly suitable for soybean oil because it is the major edible oil produced in the U.S., and canola because, as mentioned above, it has the lowest saturated acid content of commercial edible oils.

In a preferred practice of the invention, edible oil compositions stable to oxidation are prepared by adding from about 0.5% to about 10% by weight rice bran oil to the oil susceptible to oxidation. In many embodiments, from about 2% to about 5% by weight rice bran oil is employed.

An advantage of the invention is that rice bran oil is both natural and is plentiful because rice is the world's major grain crop. Rice bran (*Oryza sativa*) makes up about 6% by weight (dry basis) of rough rice and contains about 15 to 20% lipids.

It is another advantage of the invention that adding rice bran oil to an edible oil is simply accomplished by blending the oils at room temperature. It is a further advantage that the antioxidant does not significantly change the physical properties of the final stabilized edible oil composition. When used in amounts sufficient to inhibit oxidation, the rice bran oil does not affect the color, taste, viscosity or other properties of the edible oil. The rice bran oil may be conveniently added to the oil at either point of departure from the oil refinery, as is usually done with synthetic anitoxidants, or may be added at point of receipt by co-pumping it into the oil as it is transferred to the plant's oil storage tanks.

As spray oils, the naturally stabilized oils of the invention can be used alone, or in combination with any other fat or fat mimetic. The oils can be used as the sole exteriorly applied oil or as a blend, or, where multiple coats are appled, as a final coat. In preferred embodiments, the stabilized oils are the sole spray oil used on the snack products. As is discussed below, the naturally stabilized oil compositions are simply sprayed on the snack product substrate as a substitute for a conventional spray oil stabilized by hydrogenation or the addition of synthetic antioxidants.

Broadly speaking, spray oils of the invention can be employed on a variety of food products having an exterior oil application or a fat coating. Food products prepared using spray oils of the invention have a solid substrate to which the oil is applied, and, for snack products, this substrate typically has a starch, nut or fruit component. Starches include, but are not limited to, wheat flour, rye flour, rice or rice flour, other cereals such as corn or oats (whole or milled), potato chips or flour, and the like. Prepared snack substrates may additionally have an aqueous component of water, milk, fruit juice or other liquid and/or a fat component. The stabilized oils of this invention can comprise all or part of the fat component in these embodiments as well as the spray oil. The products can also contain other ingredients known to those skilled in the art such as leavening or puffing ingredients, salt, seasonings and flavorings, eggs, and the like. Prepared substrates in spray oil applications are typically baked, roasted, or, in the case of popcorn, popped prior to oil application.

In the practice of the invention, for most food products the stabilized spray oil is warmed to about 120° F. to about 160° F. and applied to the food substrate, which may also be warmed or coated warm out of the oven. Oil application is generally effected using sprayers, coating rollers, fluidized beds, or the like equipment known to the skilled artesan. The oil can be applied neat, as an emulsion or as a slurry. Where seasonings or condiments are to be applied, these may be dusted, blown or sprinkled on before or after oil application, or fed into a hopper that tumbles the food gently to coat all the surfaces before the oil is fully cooled. Alternatively, the warm oil can be mixed with seasonings or condiments, and the seasoning-oil mixture applied. Second, third, and subsequent coats of oil can be applied. It is an advantage of the invention that no additional processing steps or specialized equipment are required for processes using the stabilized spray oils of this invention.

The thickness of the oil coating is determined by the temperature of both the food and the oil, by the viscosity and solids profile of the coating, by the speed of air in the air blowers (where these are employed in the cooling and/or dusting equipment), by the rate of cooling, and by the number of applications used. Preferred snack coatings are thin, translucent, and slightly glossy.

EXAMPLES

The following examples are presented to further illustrate and explain the present invention and should not be taken as limiting in any regard. Unless otherwise mentioned, all parts and percentages are by weight, and are based on the weight at the particular stage of the processing being described.

Example 1

This example describes thermal oxidation studies to determine effective concentration ranges for stabilization.

Refined and deodorized soybean oil was blended with 2%, 5%, 10%, and 20% physically refined rice bran oil (PRRBO). Each oil sample was stored at 86° F., 122° F., and 158° F. The oil's peroxide value (PV) was monitored. The monomolecular rate equation (Labuza, T. P., CRC Critical Rev. Food Tech. 2:335 (1971)) was used to determine the rate constant for each oil's oxidation at each temperature. The Arrhenius relationship (Labuza, Theodore P., Shelf-Life Dating of Foods, Food & Nutrition Press, Inc., (1982) was used to relate the rate constants to temperature.

Using this methodology, the following rate constants (Km) were obtained:

| Rate Constants of PRRBO/Soybean Oil Blends | | | |
|---|---|---|---|
| PRRBO | Km, 86° F. | Km, 122° F. | Km, 158° F. |
| 0% | 0.004 | 0.021 | 0.117 |
| 2% | 0.002 | 0.018 | 0.068 |
| 5% | 0.001 | 0.023 | 0.066 |
| 10% | 0.004 | 0.023 | 0.091 |
| 20% | 0.003 | 0.026 | 0.077 |
| 100% | 0.003 | 0.018 | 0.047 |

The results suggest that optimum stability is between 2 to 5% PRRBO in soybean oil, with 0.5 to 10% representing useful limits of the approach.

Example 2

This example compares the efficacy of PRRBO at the 5% level against the best synthetic antioxidant, tertiary butyl hydroquinone (TBHQ) at 200 ppm+50 ppm citric acid in soybean oil.

The oil mixtures were sprayed on crackers at a 10% level, packaged, and stored at 83° F. The peroxide value (PV) of the TBHQ treatment at 1.5, 2, 2.5, 3, 3.5, 4, and 4.5 months was 5.38, 18.19, 14.18, 20.83, 21.81, 32.2, and 34.5, respectively. The PV of the PRRBO treatment at 1.5, 2, 2.5, 3, and 4 months was 7.32, 14.21, 13.87, 15.55, 20.03, 28.1, and 29.83, respectively. These results clearly indicate that the PRRBO treatment is at least equivalent, if not slightly better than, the TBHQ treatment. Thus, PRRBO can be used to replace synthetic antioxidants.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention as defined in the appended claims. The claims are meant to cover the claimed components and steps in any sequence which is effective to meet the objectives there intended, unless the context specifically indicates the contrary.

We claim:

1. A process for preparing a snack food product comprising spray-coating a baked, roasted, or popped snack food substrate containing starch or nuts with a stabilized edible oil composition containing a mixture of about 0.5 to about 10% by weight rice bran oil and another edible oil selected from the group consisting of soybean oil, canola, walnut oil, wheat germ oil, menhaden oil, rapeseed oil and mixtures thereof, such that said stabilized composition is free of off-flavors and rancidity on storage at room temperature for a period of at least six months.

2. A process according to claim 1 wherein the rice bran oil is processed to retain unsaponifiable matter.

3. A process according to claim 2 wherein the rice bran oil is physically refined rice bran oil.

4. A process according to claim 2 wherein the edible oil is selected from the group consisting of soybean oil, canola, and mixtures thereof.

5. A process according to claim 4 wherein the stabilized oil composition contains from about 2% to about 5% by weight rice bran oil.

6. A cracker prepared according to the process of claim 4.

7. An edible oil composition stable to oxidation comprising from about 0.5% to about 10% by weight rice bran oil specially processed to retain unsaponifiable matter and another edible oil selected from the group consisting of soybean oil, canola, and mixtures thereof, wherein said composition is free of off-flavors and rancidity on storage at room temperature for a period of at least six months.

8. A composition according to claim 7 comprising from about 2% to about 5% by weight specially processed rice bran oil.

9. A composition according to claim 8 wherein the specially processed rice bran oil is physically refined rice bran oil.

10. A composition according to claim 9 wherein the edible oil is soybean oil.

11. A composition according to claim 9 wherein the edible oil is canola.

12. A composition according to claim 9 consisting essentially of the edible oil and physically refined rice bran oil.

13. A stable edible oil composition comprising from about 0.5 to about 10% by weight rice bran oil and another edible oil selected from the group consisting of soybean oil, canola, walnut oil, wheat germ oil, menhaden oil, rapeseed oil and mixtures thereof, wherein said composition is free of off-flavors and rancidity on storage at room temperature for a period of at least six months.

14. A composition according to claim 13 wherein the rice bran oil is processed to retain unsaponifiable matter.

15. A composition according to claim 14 wherein the rice bran oil is physically refined rice bran oil.

16. A composition according to claim 14 wherein the edible oil is selected from the group consisting of soybean oil, canola, and mixtures thereof.

17. A composition according to claim 16 wherein the edible oil is soybean oil.

18. A composition according to claim 14 wherein the composition contains from about 2% to about 5% by weight physically refined rice bran oil.

* * * * *